(12) United States Patent
Sagrero Reza

(10) Patent No.: US 12,703,428 B2
(45) Date of Patent: Aug. 11, 2026

(54) VEHICLE REAR FASCIA ASSEMBLY

(71) Applicant: NISSAN NORTH AMERICA, INC., Franklin, TN (US)

(72) Inventor: Fernando Sagrero Reza, Wixom, MI (US)

(73) Assignee: NISSAN NORTH AMERICA, INC., Franklin, TN (US)

(*) Notice: Subject to any disclaimer, the term of this patent is extended or adjusted under 35 U.S.C. 154(b) by 324 days.

(21) Appl. No.: 18/617,329

(22) Filed: Mar. 26, 2024

(65) Prior Publication Data

US 2025/0304172 A1 Oct. 2, 2025

(51) Int. Cl.
*B62D 21/15* (2006.01)

(52) U.S. Cl.
CPC .................................. *B62D 21/152* (2013.01)

(58) Field of Classification Search
CPC .............. B60R 19/24; B60R 2019/245; B60R 2019/247; B60R 19/26; B60R 19/30; B60R 19/36; B60R 19/44; B60R 2019/1886; B62D 21/15
USPC ..................................................... 296/187.11
See application file for complete search history.

(56) References Cited

U.S. PATENT DOCUMENTS 5,580,109 A * 12/1996 Birka ...................... B60R 19/18 293/120
6,959,950 B2 * 11/2005 Bladow ................... B60R 19/18 293/154

FOREIGN PATENT DOCUMENTS

DE 19530262 A1 * 2/1996 ............. B60R 19/52
EP 1234728 A1 * 8/2002 ............. B60R 19/44

* cited by examiner

*Primary Examiner* — Amy R Weisberg
*Assistant Examiner* — Alma D. Schuster
(74) *Attorney, Agent, or Firm* — Spencer Fane, LLP

(57) ABSTRACT

A vehicle rear fascia assembly of a vehicle includes a main fascia member and a secondary fascia member. The main fascia member has guide channels (cam surfaces) on opposite lateral sides thereof and the secondary fascia member has projections located at opposite lateral sides thereof. The projections slide along the guide channels (cam surfaces) during installation of the secondary fascia member to the main fascia member causing the secondary fascia member to flex and widen as the projections are moved away from one another as the secondary fascia member is moved toward an installed orientation.

12 Claims, 9 Drawing Sheets

VEHICLE REAR FASCIA ASSEMBLY

BACKGROUND

Technical Field

The present disclosure generally relates to a vehicle rear fascia assembly. More specifically, the present disclosure relates to a vehicle rear fascia assembly that includes a main fascia member with cam surfaces on opposite lateral sides thereof and a secondary fascia member with projections located at opposite lateral sides thereof such that the projections slide along the cam surfaces during installation of the secondary fascia member flexing the secondary fascia member moving the projection away from one another as the secondary fascia member is moved toward an installed orientation.

Background Information

Bumper assemblies of most vehicles include a fascia assembly that covers and conceals the impact energy absorbing elements of the bumper assembly. The fascia assembly is typically a one-piece trim element that includes attachment structure.

SUMMARY

It has been discovered that a rear fascia assembly has improved impact energy deflecting characteristics and an improved appearance when the rear fascia assembly includes a main fascia member and a secondary fascia member that are attached to one another.

In view of the state of the known technology, one aspect of the present disclosure is to provide a vehicle rear fascia assembly with a main fascia member and a secondary fascia member. The main fascia member is dimensioned and configured to cover a lower rear portion of a vehicle. The main fascia member has a first lateral side, a mid-section and a second lateral side. The first lateral side covers a rearward lateral end of a first side of the vehicle, the mid-section covers a mid-section of the lower rear portion of the vehicle and the second lateral side covers a rearward area of a second side of the vehicle. The main fascia member has a first guide channel along the first lateral side and a second guide channel along the second lateral side. The secondary fascia member has a first lateral end and a second lateral end. The secondary fascia member is dimension to attach to portions of the main fascia member such that when the secondary fascia member is being installed to the main fascia member a portion of the first lateral end contacts the first guide channel and a portion of the second lateral end contacts the second guide channel urging the first lateral end away from the second lateral end thereby causing the secondary fascia member to flex prior to the secondary fascia member being moved to a final attachment orientation relative to the main fascia member.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
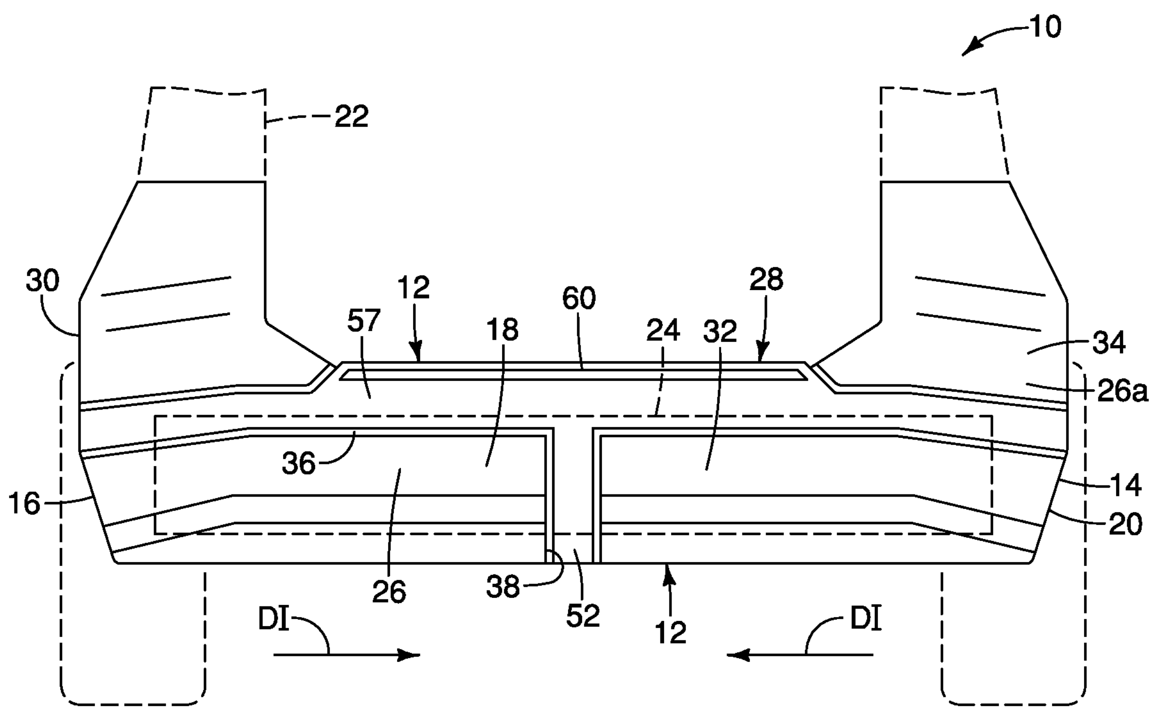
FIG. 1 is a rear view of a vehicle showing a rear bumper assembly covered and concealed by a rear fascia assembly that includes a main fascia member and a secondary fascia member in accordance with an exemplary embodiment.

Referring initially to FIG. 1, a vehicle 10 that includes a rear fascia assembly 12 is illustrated in accordance with a first embodiment. The vehicle 10 includes a lower rear portion 14 with a bumper assembly 24 (shown in phantom in FIG. 1) attached thereto in a conventional manner. The lower rear portion 14 of the vehicle 10 has a first side 16, a mid-section 18 and a second side 20. Further, the vehicle 10 defines a rear opening 22 that receives a movable rear door (not shown) that moves between an open orientation exposing the opening 22 and a closed orientation (not shown) covering the opening 22.

The rear fascia assembly 12 is dimensioned and configured to cover the lower rear portion 14 of the vehicle 10 and the bumper assembly 24. Further, the rear fascia assembly 12 is considered to be a part of the bumper assembly 24 in that elements of the rear fascia assembly 12 are flexible and resilient and are able to withstand minor impact events and experience little or no signs of damage transmitting the impact force to the bumper assembly 24. The rear fascia assembly 12 includes a main fascia member 26 and a secondary fascia member 28. The main fascia member 26 is attached to portions of the vehicle 10 in a conventional manner. Therefore, description of the conventional attachments between the main fascia member 26 and the vehicle 10 is omitted for the sake of brevity.

The main fascia member 26 has a first lateral side 30, a mid-section 32 and a second lateral side 34. When the main fascia member 26 is installed to the vehicle 10, the first lateral side 30 covers the first side 16 (a rearward lateral end) of the vehicle 10. The mid-section 32 covers the mid-section 18 of the lower rear portion 14 of the vehicle 10 below the rear opening 22 (also referred to as the rear door opening 22). The second lateral side 34 of the main fascia member 26 covers a rearward area of the second side 20 of the vehicle 10.

Figure 2:
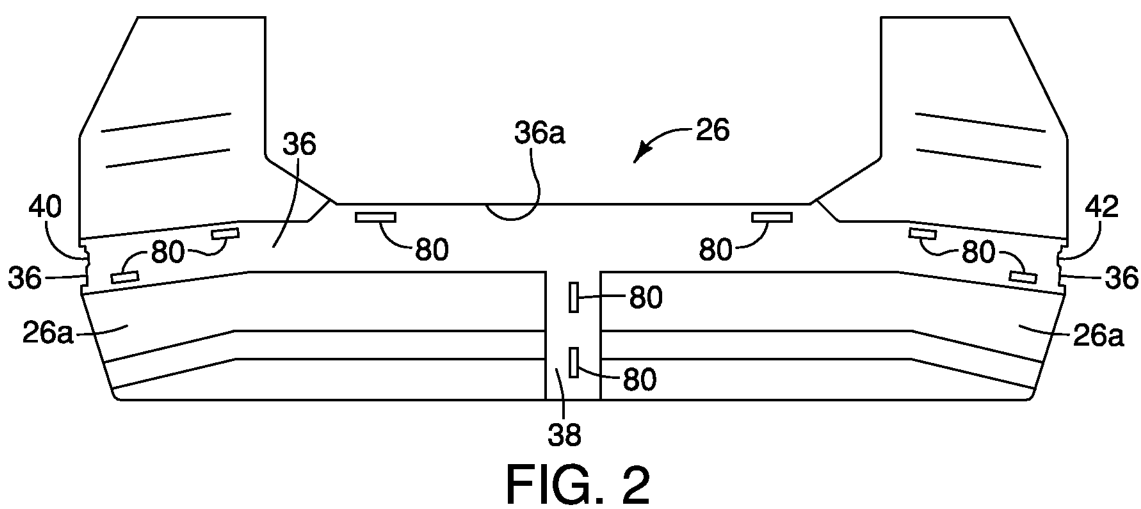
FIG. 2 is a rear view of the main fascia member removed from the vehicle showing a recess dimensioned to receive the secondary fascia member, a first guide channel at a first lateral side of the main fascia member and a second guide channel at a second lateral side of the main fascia member in accordance with the exemplary embodiment.

As shown in FIG. 2, the main fascia member 26 includes an outboard surface **26*a* with a main recess 36 that extends from the first lateral side 30 to the second lateral side 34. Along the mid-section 32 of the main fascia member 26, the recess 36 extends upward defining a surface section 36*a*. The surface section 36*a* of the recess 36 corresponds to the lower area of the rear opening 22 and is approximately the same width as the lower end of the rear opening 22. In other words, the recess 36 extends upward along the mid-section 32 of the rear fascia assembly 12. The recess 36 also defines a downwardly extending recess portion 38. The recessed portion 38 has the same depth as the recess 36 relative to adjacent portions of an outboard surface 26*a* of the main fascia member 26. The recessed portion extends downward to a lower edge of the main fascia member 26. As shown in FIGS. 6 and 16-18, the main fascia member 26 also has an inboard surface 26*b*** described in greater detail below.

As shown in FIGS. 2, 5, 7 and 9-12, the main fascia member 26 includes a first guide channel 40 along the first lateral side 30 within the recess 36 and a second guide channel 42 along the second lateral side 34 within the recess 36. The first guide channel 40 and the second guide channel 42 are identical, except that they are symmetrical mirror images of one another and are located at opposite lateral sides of the main fascia member 26. A more detailed description of the first guide channel 40 and the second guide channel 42 is provided below.

Figure 3:
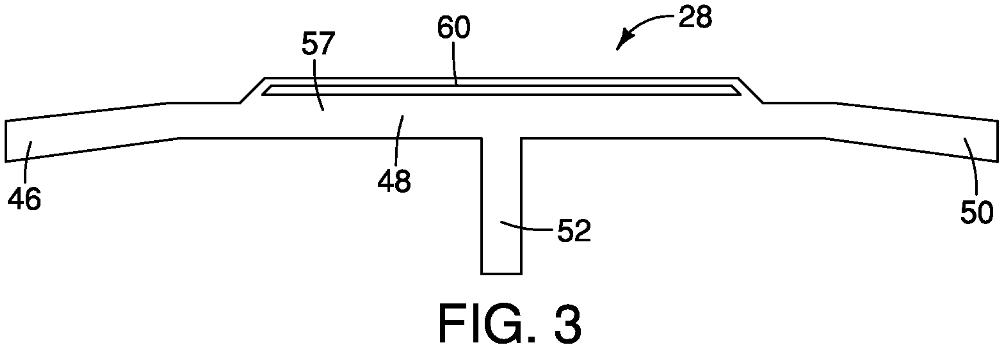
FIG. 3 is a rear view of the secondary fascia member removed from the vehicle and removed from the main fascia member in accordance with the exemplary embodiment.
Figure 4:
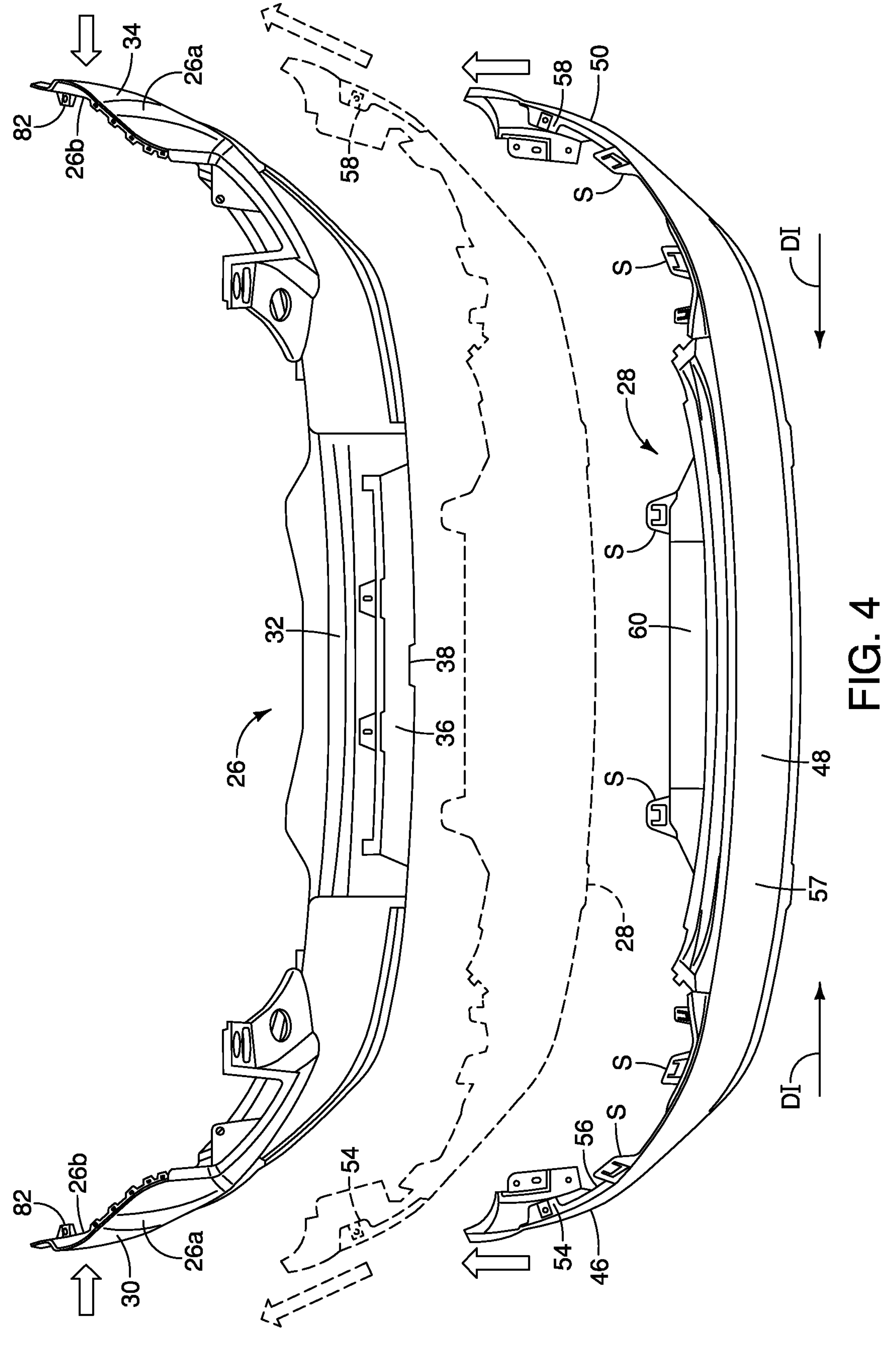
FIG. 4 is a top exploded view of the main fascia member and the secondary fascia member spaced apart from one another, showing the secondary fascia member in phantom in a flexed state and further showing a first protrusion at a first lateral end of the secondary fascia member and a second protrusion at a second lateral end of the secondary fascia member in accordance with the exemplary embodiment.

As shown in FIGS. 1, 3 and 4, the secondary fascia member 28 has a first lateral end 46, a mid-section 48, a second lateral end 50 and a downwardly extending panel portion 52 (shown in FIGS. 1 and 3). The first lateral end 46 has a first protrusion 54 that extends in an inboard direction $D_I$ relative to the vehicle 10 from an inboard side 56 of the first lateral end 46. The second lateral end 50 has a second protrusion 58 that extends in the inboard direction $D_I$ relative to the vehicle 10 from the inboard side 56 of the first lateral end 46. Further, the first protrusion 54 (also referred to as a portion 54 of the first lateral end 46) and the second protrusion 58 (also referred to as a portion 58 of the second lateral end 58) extend toward one another, as shown in FIG. 4. The secondary fascia member 28 also has an outboard side 57.

The mid-section 48 of the secondary fascia member 28 further includes an upper panel section 60 that extends slightly upward and then in a forward direction relative to the vehicle 10 at least partially at least partially covering a sill area of a rear door opening 22 of the vehicle 10.

Figure 12:
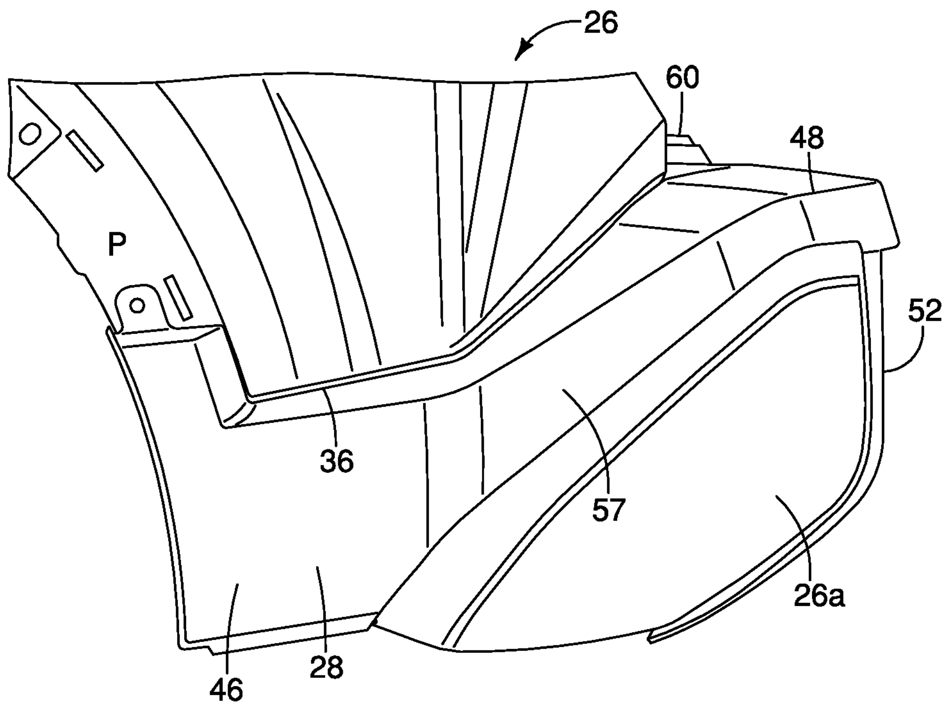
FIG. 12 is yet another perspective view of the first protrusion of the first lateral end of the secondary fascia member and the first guide channel similar to FIGS. 9-11 showing the first protrusion being moved forward beyond the first guide channel such that the first protrusion moves past a forward edge portion of the main fascia member and enters an open area defined by the main fascia member thereby releasing the secondary fascia member from the flexed orientation shown in phantom in FIG. 4 to a final installed position (an unflexed position) as shown in FIGS. 1, 17 and 18 as a fourth and final step in the process or method of installing the secondary fascia member to the main fascia member in accordance with the exemplary embodiment.
Figure 13:
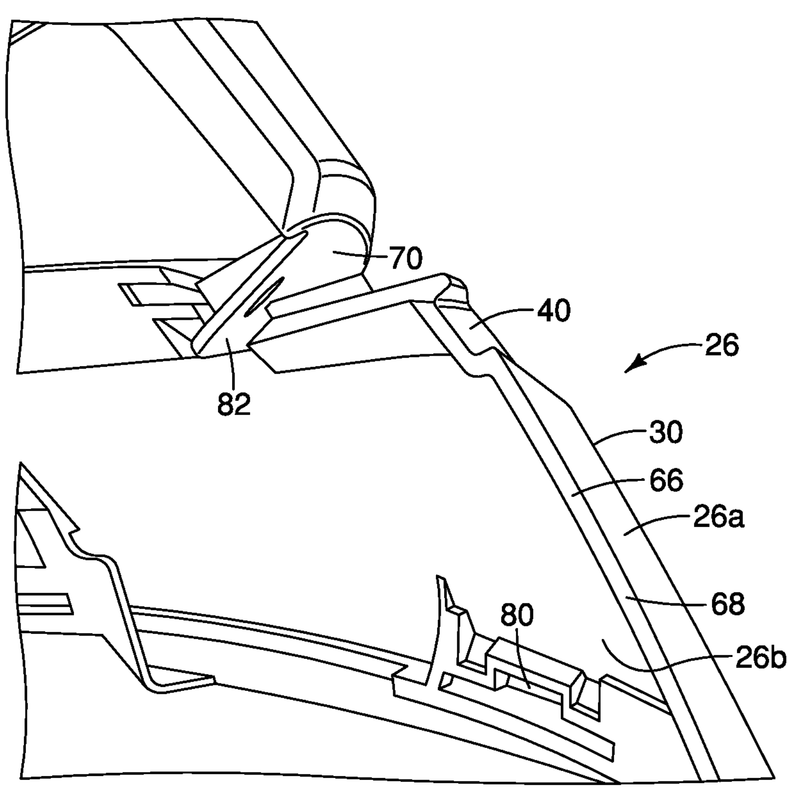
FIG. 13 is a front perspective view of the main fascia member showing an inboard surface of the main fascia member with slots dimensioned to receive snap-fitting projections of the secondary fascia member, an attachment flange, the forward edge portion and an upper edge portion, with the forward edge portion and the upper edge portion defining the open area in accordance with the exemplary embodiment.
Figure 14:
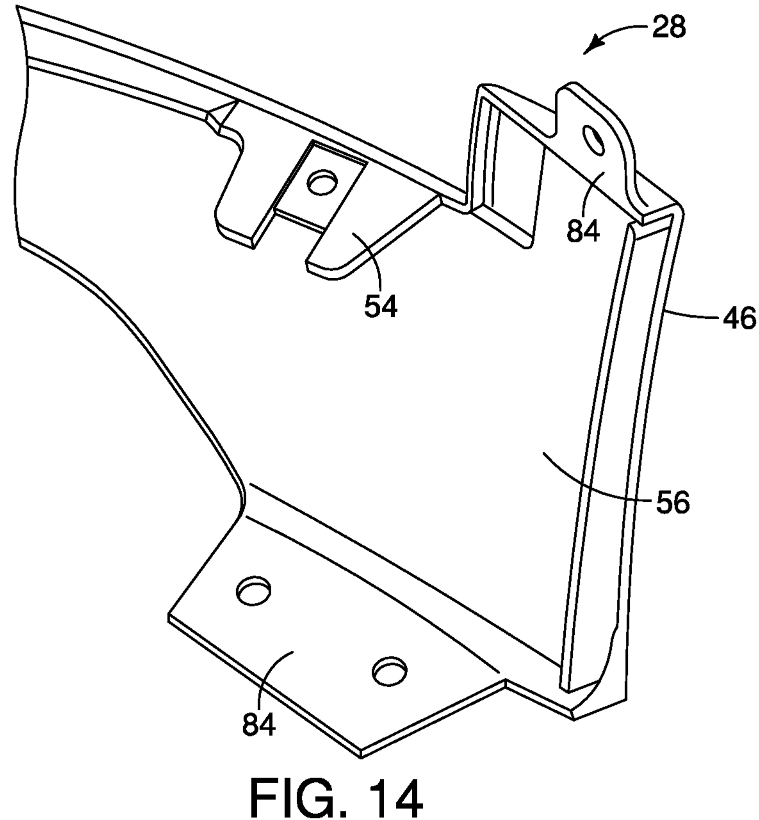
FIG. 14 is a front perspective view of the first lateral end of the secondary fascia member showing the first projection and attachment flanges in accordance with the exemplary embodiment.
Figure 15:
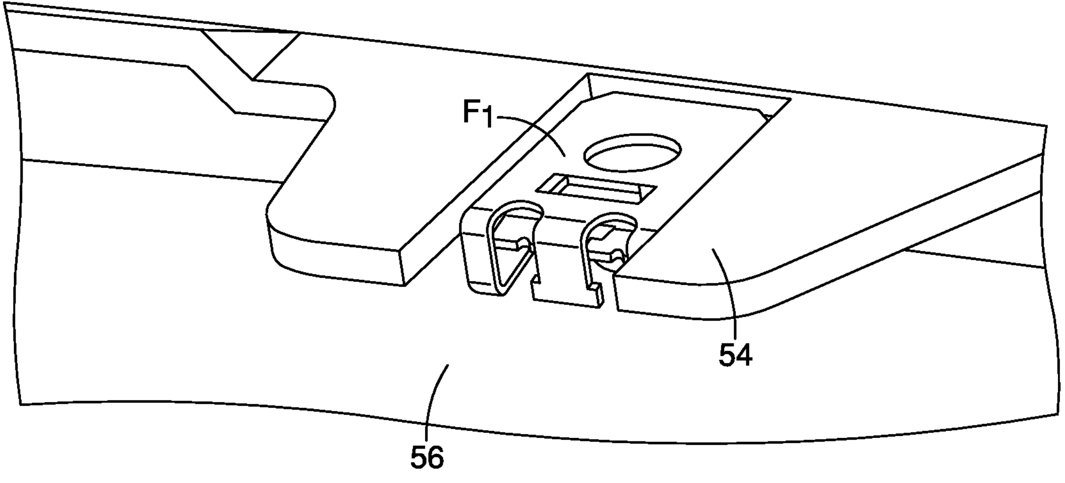
FIG. 15 is a perspective view of the first projection extending from an inboard side of the first lateral end of the secondary fascia member showing a first fastener installed to the first projection in accordance with the exemplary embodiment.

The secondary fascia member 28 is dimensioned to attach to portions of the main fascia member 26. When the secondary fascia member 28 is being installed to the main fascia member the first protrusion 54 of the first lateral end 46 contacts the first guide channel 40 and the second protrusion 58 of the second lateral end 50 contacts the second guide channel 42 urging the first lateral end 46 away from the second lateral end 50 thereby causing the secondary fascia member 28 to elastically deform or flex to a flexed state shown in phantom lines (broken lines) in FIG. 4. At the right side of FIG. 4, the secondary fascia member 28 is shown in an unflexed state (its original shape) when uninstalled to the main fascia member 26. In the center of FIG. 4, the secondary fascia member 28 is shown in an intermediate orientation or flexed state due to contact of the first and second protrusions 54 and 58 with respective ones of the channels 40 and 42 prior to the secondary fascia member 28 being moved toward a final attachment orientation relative to the main fascia member 26. The final attachment orientation of the secondary fascia member 28 is shown in FIGS. 1 and 12. Specifically, the secondary fascia member 28 is shaped and dimensioned such that when in a final attachment orientation (shown in FIG. 1) relative to the main fascia member 26, the various corresponding portions of the secondary fascia member 28 fit within the main recess 36 and the recessed portion 38 and overlay the surface section **36*a* of the main fascia member 26, as shown in FIG. 1. Further, when moved to the final attachment orientation, the secondary fascia member 28 unflexes and returns to its original shape, as shown in solid lines in FIGS. 4 and 12**.

In other words, the broken line or phantom line depiction of the secondary fascia member 28 in FIG. 4 shows the secondary fascia member 28 flexed to a degree necessary for installation to the main fascia member 26. For demonstration purpose only, the phantom line depiction in FIG. 4 of the flexed secondary fascia member 28 is shown spaced apart from the main fascia member 26. However, it should be understood, as described further below, it is contact between the first guide channel 40 and the first protrusion 54, and contact between the second guide channel 42 and the second protrusion 58 that causes the flexing of the secondary fascia member 28. Alternatively, if two technicians are installing the secondary fascia member 28 to the main fascia member 26, the two technicians can manually pull the first lateral end 46 and the second lateral end 50 of the secondary fascia member 28 away from one another, thereby flexing the secondary fascia member 28 and install it to the main fascia member 26. However, in the depicted embodiment, only one technician is required for installation of the secondary fascia member 28 to the main facia member 26. The single technician pushes aligns the secondary fascia member 28 with the main fascia member 26 causes interaction between the first and second protrusions 54 and 58 to contact the first and second guide channels 40 and 42 thereby causing the desired flexing of the secondary fascia member 26, as is described further below.

The first guide channel 40 and the second guide channel 42 are identical, except that they are symmetrical mirror images of one another. Therefore, description of one of the first and second guide channels 40 and 42 applies equally to both. Further, the first protrusion 54 and the second protrusion 58 are identical, except that they are symmetrical mirror images of one another and extend toward one another. Therefore, description of one of the first and second protrusions 54 and 58 applies equally to both.

Further, the first lateral side 30 and the second lateral side 34 of the main fascia member 26 are identical, except that they are symmetrical mirror images of one another and extend toward one another. The first lateral end 46 and the second lateral end 50 of the secondary fascia member 28 are also identical, except that they are symmetrical mirror images of one another and extend toward one another. Therefore, description of one of the first and second lateral sides 30 and 34 applies equally to both. Further, description of one of the first and second protrusions 54 and 58 applies equally to both.

Figures 5, 6:
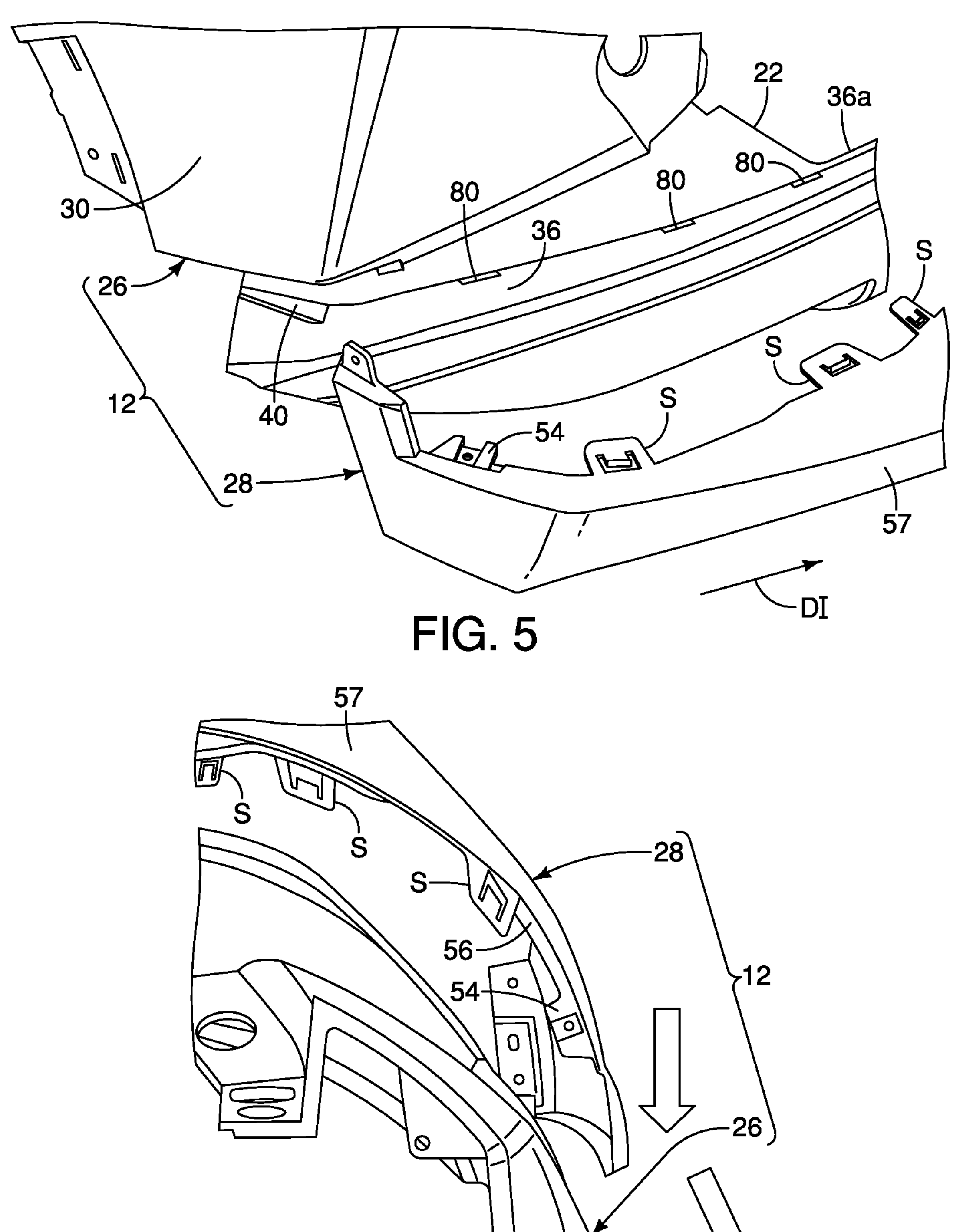
FIG. 5 is a perspective exploded view of the main fascia member and the secondary fascia member spaced apart from one another showing the first guide channel on a first lateral side of the main fascia member and the first projection of the secondary fascia member aligned with one another prior to installation of the secondary fascia member to the main fascia member in accordance with the exemplary embodiment.
FIG. 6 is a top view of the first lateral side of the main fascia member and the first lateral end of the secondary fascia member showing the secondary fascia member being moved from an uninstalled position toward an installed position relative to the first lateral side of the main fascia member in accordance with the exemplary embodiment.
Figure 7:
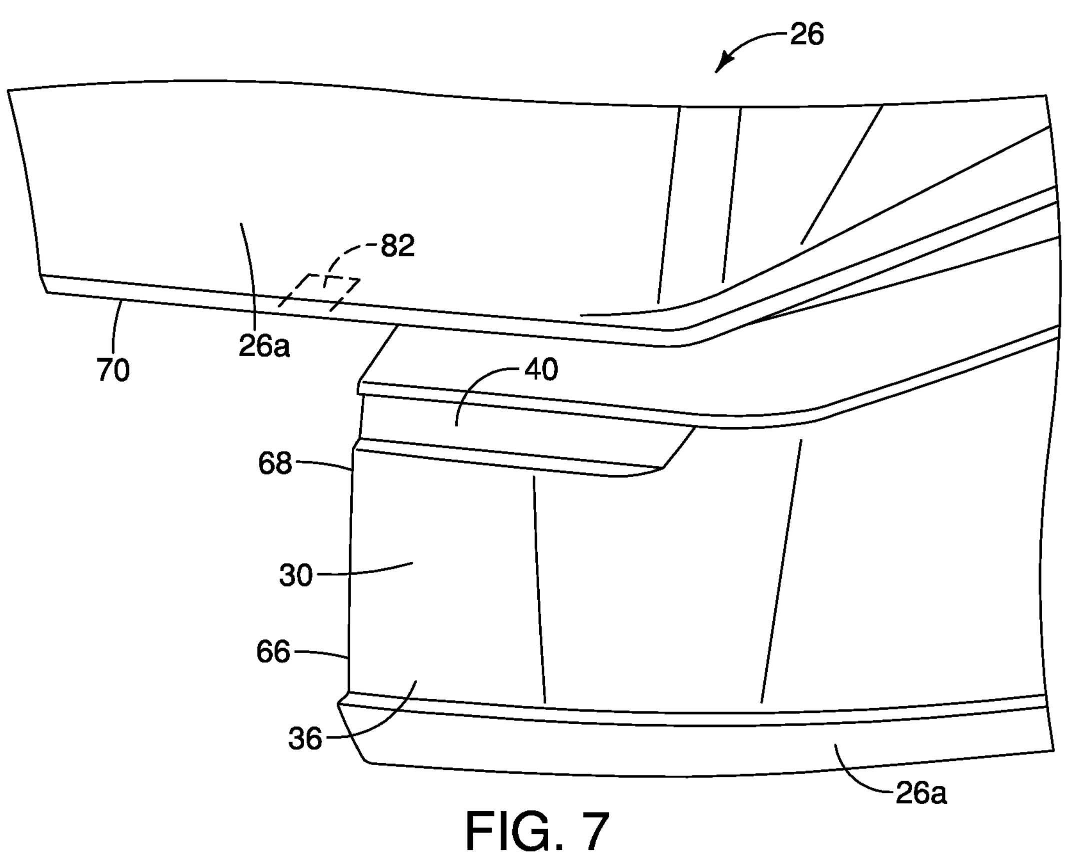
FIG. 7 is a perspective view of the first lateral side of the main fascia member showing the first guide channel in accordance with the exemplary embodiment.
Figure 8:
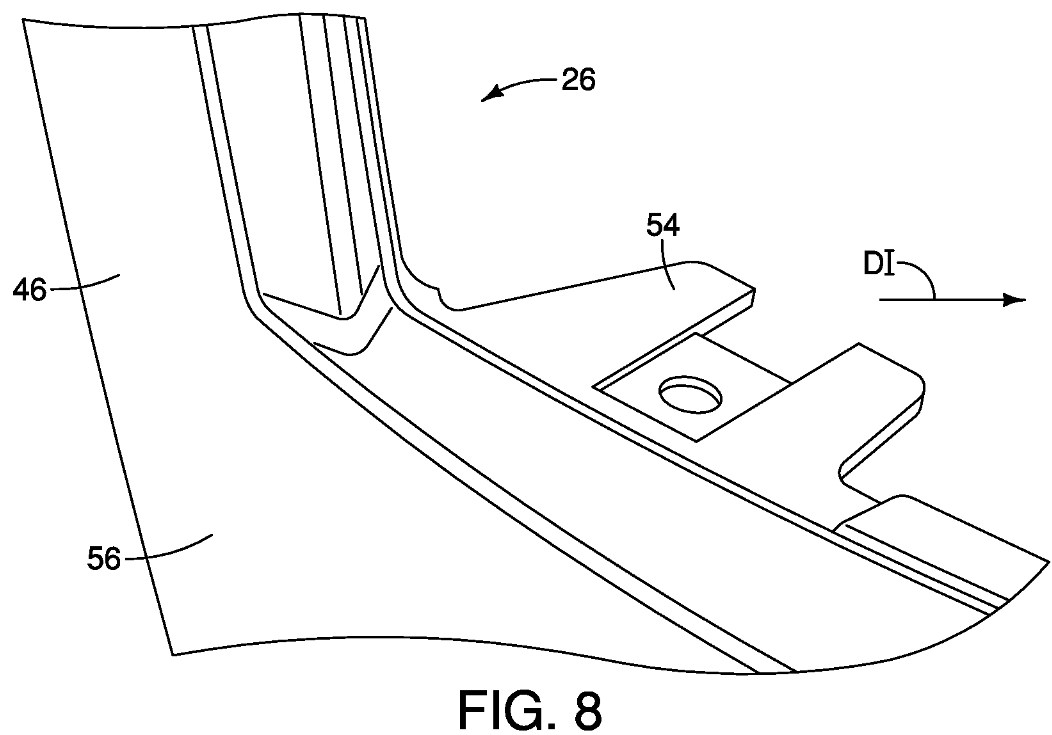
FIG. 8 is a perspective view of the first lateral end of the secondary fascia member showing the first protrusion in accordance with the exemplary embodiment.

As shown in FIGS. 5 and 7, the first guide channel 40 is formed at a forward end of the main recess 36 within the main recess 36 (forward relative to the vehicle 10). The main fascia member 26 has a forward edge portion 66 that extends downward from a forward end of the first guide channel 40, as shown in FIG. 7. The forward edge portion 66 at least partially defines an open area 68. The open area 68 can be a slot or large opening. However, in the depicted embodiment, the open area 68 is a space forward of the forward edge portion 66 that is dimensioned to allow the first protrusion 54 to be located in the open area 68 when the secondary fascia member 28 is installed to the main fascia member 26, as is described in greater detail below.

The open area 68 is further defined by an edge portion 70 that extends along a bottom end of the first lateral side 30 of the main fascia member 26. The edge portion 70 extends rearward from a location above the first guide channel 40.

FIGS. 9-12 show a process or method for installing the secondary fascia member 28 to the main fascia member 26.

Figure 9:
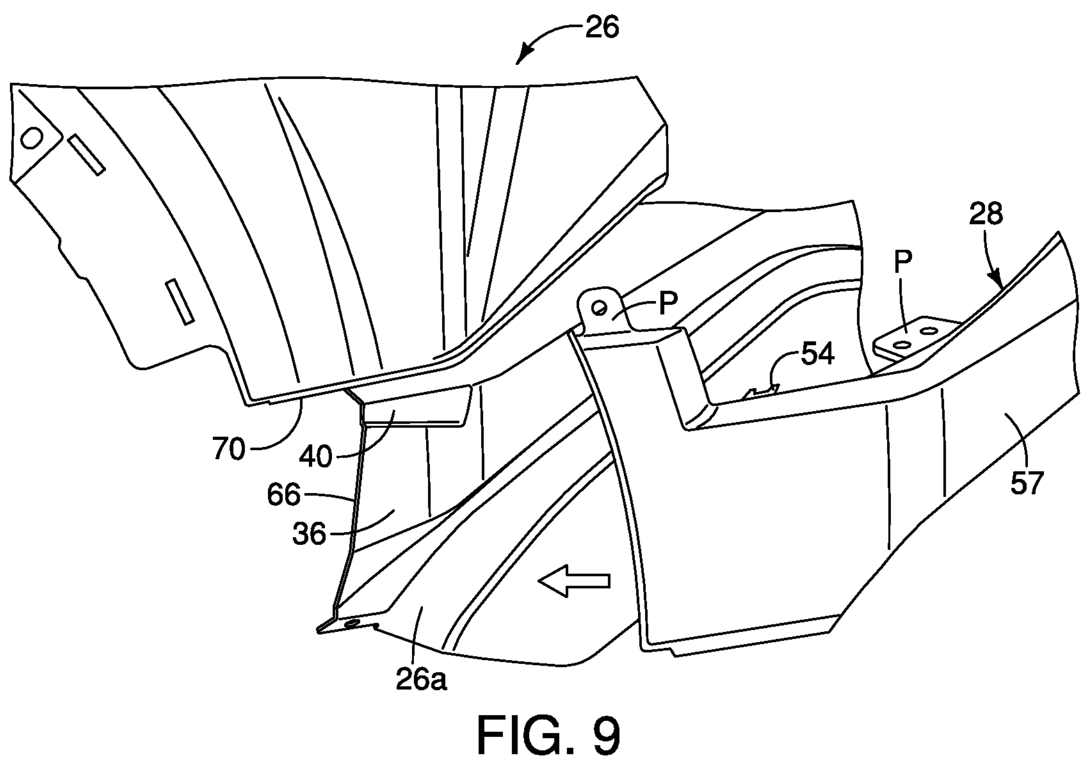
FIG. 9 is a perspective view of the first protrusion of the first lateral end of the secondary fascia member and the first guide channel showing the first protrusion of the secondary fascia member being aligned with the first guide channel as a first step in a process or method of installing the secondary fascia member to the main fascia member in accordance with the exemplary embodiment.

As shown in FIG. 9, the secondary fascia member 28 is aligned but separated from the main fascia member 28 in a first step of the method of installing the secondary fascia member 28 to the main fascia member 36. The first protrusion 54 at the first lateral end 46 of the secondary fascia member 28 is lined up with the first guide channel 40 of the main fascia member 26. Although not shown, simultaneously, the second protrusion 58 at the second lateral end 50 of the secondary fascia member 28 is lined up with the second guide channel 42 of the main fascia member 26. As indicated by the arrow in FIG. 9, the secondary fascia member 28 can then be moved toward the main fascia member 28, as shown in FIG. 10.

Figure 10:
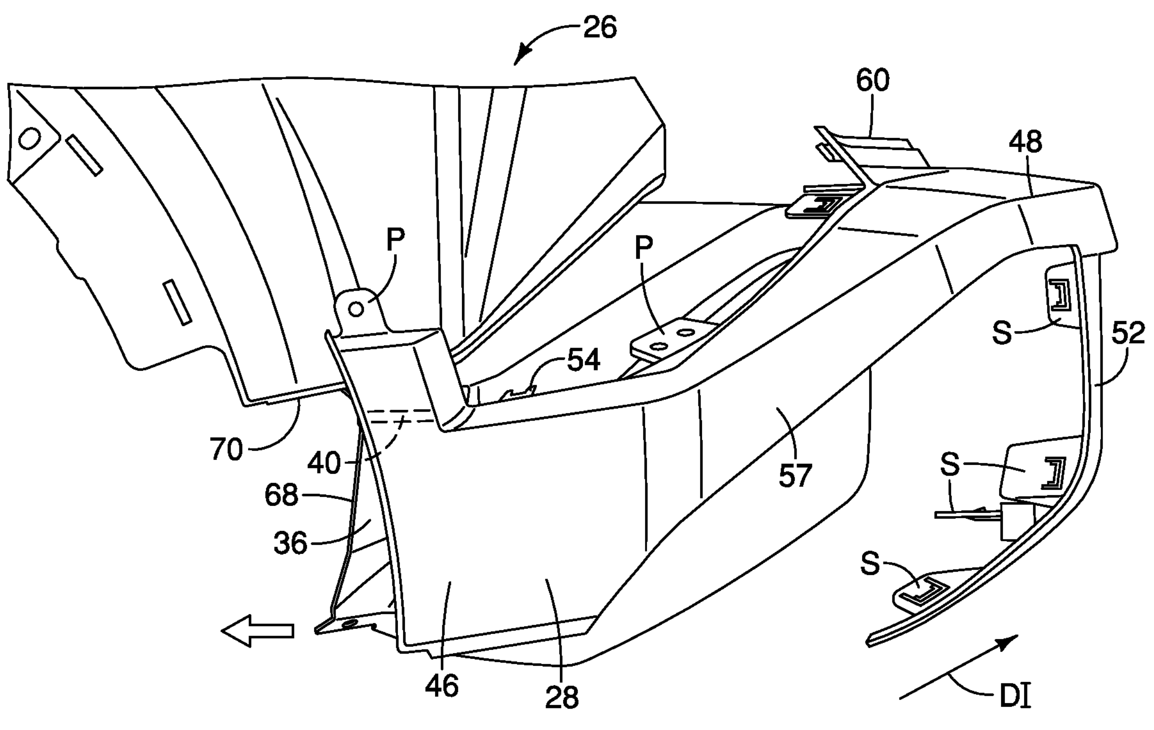
FIG. 10 is another perspective view of the first protrusion of the first lateral end of the secondary fascia member and the first guide channel similar to FIG. 9 showing the secondary fascia member being moved closer to the main fascia member and the first guide channel as a second step in the process or method of installing the secondary fascia member to the main fascia member in accordance with the exemplary embodiment.

A second step is shown in FIG. 10, with the first protrusion 54 being moved into closer to and eventually contacting the surface of the first guide channel 40, the surface of the first guide channel 40 acting as a cam surface. Simultaneously, although not shown, the second protrusion 58 is also moved closer to and eventually contacting the surface of the second guide channel 42, the surface of the second guide channel 42 also acting as a cam surface.

Figure 11:
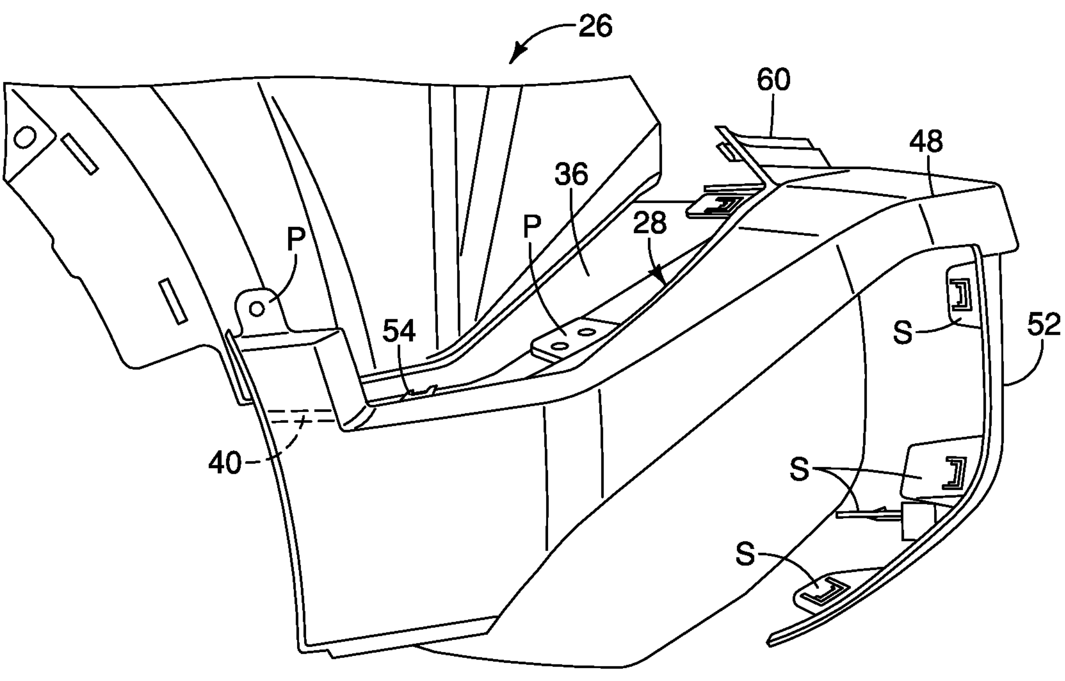
FIG. 11 is another perspective view of the first protrusion of the first lateral end of the secondary fascia member and the first guide channel similar to FIGS. 9 and 10 showing the first protrusion being moved into contact with the first guide channel as a third step in the process or method of installing the secondary fascia member to the main fascia member where the secondary fascia member flexes becoming longer with the first and second protrusions being moved away from one another as shown in phantom in FIG. 4, in accordance with the exemplary embodiment.

A third step is shown in FIG. 11, with the first protrusion 54 contacting and moving along the surface of the first guide channel 40. Simultaneously, although not shown, the second protrusion 58 also moves along the surface of the second guide channel 42. The first guide channel 40 and the second guide channel 42 diverge moving in a vehicle forward direction. In other words, rear ends of the first and second guide channels 40 and 42 are a first distance away from one another and the forward ends of the first and second guide channels 40 and 42 are a second distance away from one another with the second distance being greater than the first distance. Thus, as the secondary fascia member 28 is moved in the vehicle forward direction contact between the first and second protrusions 54 and 58 with the corresponding first and second guide channels 40 and 42 causes the secondary fascia member 28 to flex, as shown in phantom lines in FIG. 4.

Figure 16:
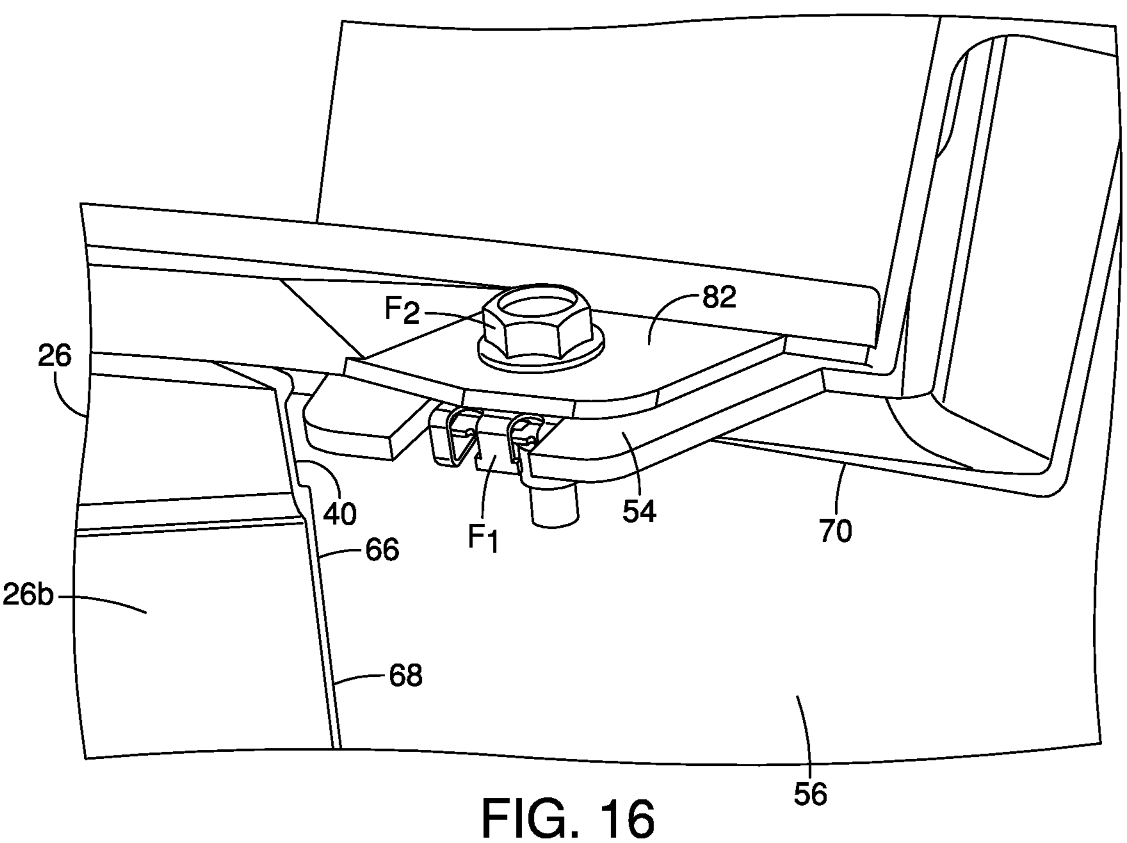
FIG. 16 is a perspective view of inboard surfaces of the main fascia member and the secondary fascia member with the first projection being fixed to the attachment flange of the main fascia member via a second fastener that is threadedly attached to the first fastener on the first projection in accordance with the exemplary embodiment.
Figure 17:
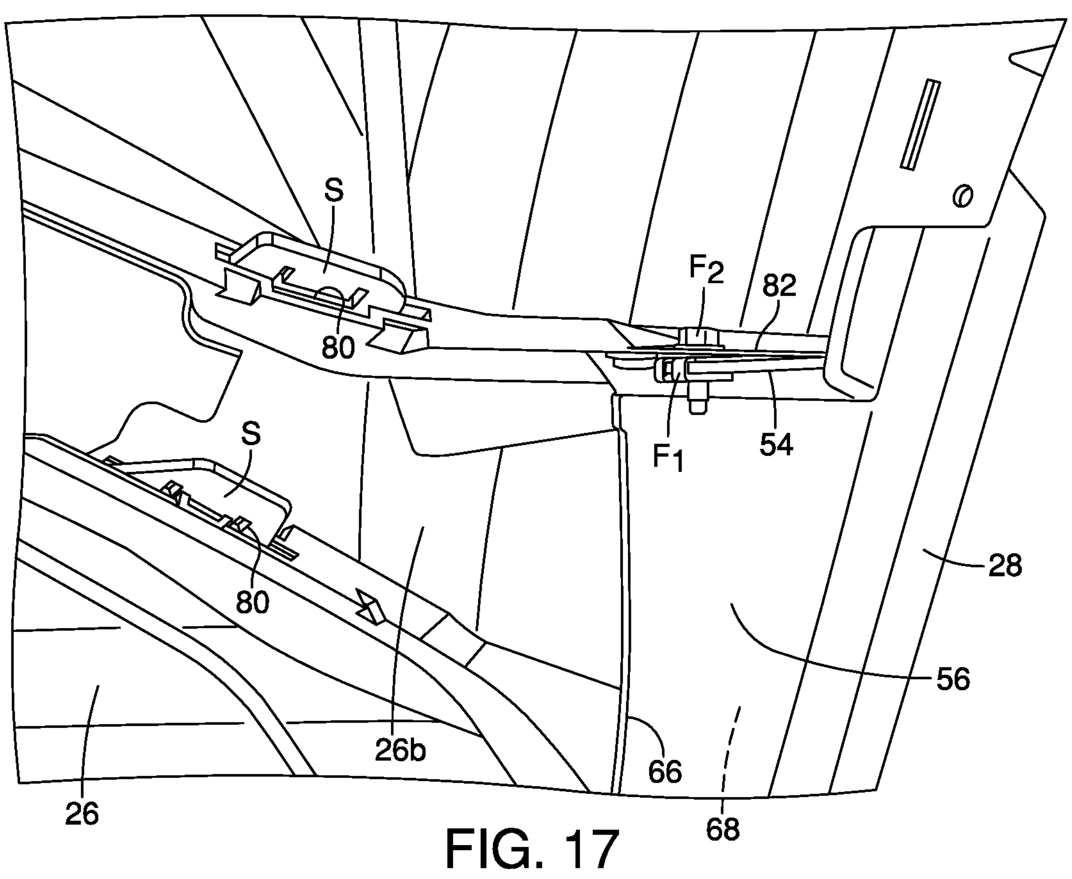
FIG. 17 is another perspective view of inboard surfaces of the main fascia member and the secondary fascia member showing the first protrusion attached to the attachment flange and two of the snap-fitting projections of the secondary fascia member installed to corresponding slots of the main fascia member fixing the secondary fascia member to the main fascia member in accordance with the exemplary embodiment.
Figure 18:
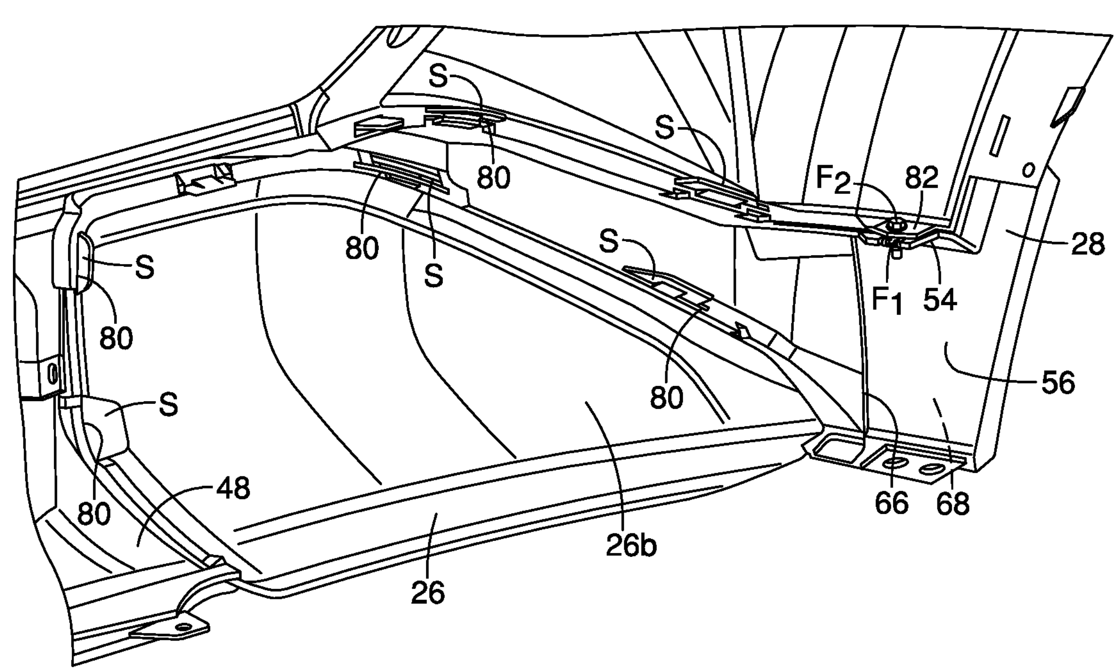
FIG. 18 is another perspective view of inboard surfaces of the main fascia member and the secondary fascia member showing a plurality of the snap-fitting projections of the secondary fascia member installed to corresponding ones of the slots of the main fascia member fixing the secondary fascia member to the main fascia member in accordance with the exemplary embodiment.

A fourth step is shown in FIG. 12 where the first protrusion 54 of the first lateral end 46 of the secondary fascia member 28 is moved forward beyond the first guide channel 40 and beyond the forward edge 66 of the main fascia member 26. Similarly but not shown, the second protrusion 58 of the second lateral end 50 of the secondary fascia member 28 is moved forward beyond the second guide channel 42 and beyond the forward edge 66 of the main fascia member 26. In other words, both the first protrusion 54 and the second protrusion 58 (but not show) are now located in the open area 68 defined forward of the forward edge portion 66 of the first lateral side 30 of the main fascia member 26, as shown in FIGS. 16, 17 and 18.

Once the first protrusion 54 and the second protrusion 48 have been moved forward of the forward edge portion 66 and into the open area 68, the secondary fascia member 28 is released from the cam forces applied by contact between, the first and second protrusions 54 and 58 and the first and second guide channels 40 and 42. As a result, the secondary fascia member 28 can return to its original shape shown in solid lines in FIG. 4. In other words, the secondary fascia member 28 is no longer flexed. A consequence of no longer being flexed is that the first and second protrusions 54 and 58 clamp the secondary fascia member 28 to the main fascia member 26. Further, the proper installation of the secondary fascia member 28 to the main fascia member 26 results in the first lateral end 46, the mid-section 58 and the second lateral end 50 all being located within the main recess 36 of the main fascia member 26.

As shown in FIGS. 2, 5, 13 and 17-18, the main fascia member 26 includes a plurality of slots 80. As shown in FIGS. 4-6, 10-11 and 17-18, the secondary fascia member 28 includes a corresponding number of snap-fitting projections S. During second and third steps of the method for installing the secondary fascia member 28 to the main fascia member 26, the snap-fitting projections S are aligned with corresponding ones of the slots 80. In the third and fourth steps of the method for installing the secondary fascia member 28 to the main fascia member 26, the snap-fitting projections S are inserted into the corresponding ones of the slots 80. Once the snap-fitting projections S are fully inserted into the corresponding ones of the slots 80, the secondary fascia member 28 is locked to the main fascia member 26 by the snap-fitting action of the snap-fitting projections S as they are fully inserted into the slots 80. Since snap-fitting projections are conventional attachment structures, further description is omitted for the sake of brevity.

Further, the downwardly extending panel portion 52 includes snap-fitting projections S that extend through corresponding slots 80 in the downwardly extending recess portion 38 of the main recess 36. Thus, the downwardly extending panel portion 52 of the secondary fascia member 28 is aligned with and retained within the downwardly extending recess portion 38 of the main recess 36 of the main fascia member 26.

Prior to installing the secondary fascia member 28 to the main fascia member 26, first fastener parts $F_1$ are installed to each of the first and second protrusions 54 and 58. After the four steps of the method for installing the secondary fascia member 28 to the main fascia member 26 have been completed, the secondary fascia member 28 is released from the flexed orientation shown in phantom in FIG. 4 to the final installed position (an unflexed position) as shown in FIGS. 1, 17 and 18. The first protrusion 54 and the second protrusion 48 have moved forward of the forward edge portion 66 and into the open area 68. The first protrusion 54 now aligns with an attachment flange 82 of the main fascia member 26, as shown in FIGS. 16-18. A second fastener part $F_2$ can then be installed to the attachment flange 82 in order to hold the secondary fascia member 28 to the main fascia member 26. Additional first fastener parts $F_1$ and second fastener parts $F_2$ can be installed at various locations (not shown) along the inboard surface **26*b* and inboard side 56 of the main fascia member 26 and the secondary fascia member 28 to fixedly secure the secondary fascia member 28 to the main fascia member 26**.

One of the advantages of the configuration of the secondary fascia member 28 and the main fascia member 26 (the protrusions 54 and 58 and the channels 40 and 42) is that a single technician can install the secondary fascia member 28 to the main fascia member 26. In the absence of the protrusions 54 and 58 and the channels 40 and 42, two technicians are required to flex the secondary fascia member 28 (as shown in phantom lines in FIG. 4) so that the first and second lateral ends 46 and 50 can be moved forward of the forward edge portions 66 of the main fascia member 26 without contacting the main fascia member 26.

Hence, with the protrusions 54 and 58 and the channels 40 and 42 of the secondary fascia member 28 and the main fascia member 26 the secondary fascia member 28 can be moved to the final attachment orientation relative to the main fascia member 26 without scratching the main fascia member 26.

The structural portions of the vehicle 10 other than the rear fascia assembly 12 are conventional components that are well known in the art. Since such vehicle structure portions are well known in the art, these structures will not be discussed or illustrated in detail herein. Rather, it will be apparent to those skilled in the art from this disclosure that the components can be any type of structure and/or programming that can be used to carry out the present invention.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment(s), the following directional terms "forward", "rearward", "above", "downward", "vertical", "horizontal", "below" and "transverse" as well as any other similar directional terms refer to those directions of a vehicle equipped with the vehicle rear fascia assembly. Accordingly, these terms, as utilized to describe the present invention should be interpreted relative to a vehicle equipped with the vehicle rear fascia assembly.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A vehicle rear fascia assembly comprising a main fascia member dimensioned and configured to cover a lower rear portion of a vehicle, the main fascia member having a first lateral side, a mid-section and a second lateral side with the first lateral side covering a rearward lateral end of a first side of the vehicle, the mid-section covering a mid-section of the lower rear portion of the vehicle and the second lateral side covering a rearward area of a second side of the vehicle, the main fascia member has a first guide channel along the first lateral side and a second guide channel along the second lateral side; and a secondary fascia member having a first lateral end and a second lateral end, the secondary fascia member being dimension to attach to portions of the main fascia member such that when the secondary fascia member is being installed to the main fascia member a portion of the first lateral end contacts the first guide channel and a portion of the second lateral end contacts the second guide channel urging the first lateral end away from the second lateral end thereby causing the secondary fascia member to flex prior to the secondary fascia member being moved to a final attachment orientation relative to the main fascia member.

2. The vehicle rear fascia assembly according to claim 1, wherein the secondary fascia member is configured and dimensioned such that when the secondary fascia member is in the final attachment orientation relative to the main fascia member, the portion of the first lateral end is moved past the first guide channel beyond a forward edge of the first lateral side and the portion of the second lateral end is moved past the second guide channel beyond a forward edge of the first lateral side such that the secondary fascia member unflexes grasping the main fascia member.

3. The vehicle rear fascia assembly according to claim 1, wherein the portion of the first lateral end is a first protrusion that extends in an inboard direction relative to the vehicle and the portion of the second lateral end is a second protrusion that extends in an inboard direction toward the first protrusion.

4. The vehicle rear fascia assembly according to claim 3, wherein the first protrusion and the second protrusion each include a central recessed area dimension to receive corresponding first fastener parts when the secondary fascia member is in the final attachment orientation relative to the main fascia member.

5. The vehicle rear fascia assembly according to claim 4, wherein the first lateral side and the second lateral side of the main fascia member each includes a corresponding fastener flange that extends in an inboard direction, each corresponding fastener flange having an opening dimensioned to receive a second fastener part that engages a corresponding one of the first fastener parts with the secondary fascia member in the final attachment orientation relative to the main fascia member thereby fixedly attaching the secondary fascia member to the main fascia member.

6. The vehicle rear fascia assembly according to claim 5, wherein the main fascia member includes a plurality of slots and the secondary fascia member includes a plurality of snap-fitting projections that are retained in corresponding ones of the plurality of slots when the secondary fascia member is in the final attachment orientation relative to the main fascia member.

7. The vehicle rear fascia assembly according to claim 4, wherein the secondary fascia member is configured and dimensioned such that when the secondary fascia member is in the final attachment orientation relative to the main fascia member, the first protrusion of the first lateral end has moved past the first guide channel beyond a forward edge of the first lateral side and the second protrusion of the second lateral end has moved past the second guide channel beyond a forward edge of the first lateral side such that the secondary fascia member unflexes grasping the main fascia member.

8. The vehicle rear fascia assembly according to claim 1, wherein the main fascia member includes a plurality of slots and the secondary fascia member includes a plurality of snap-fitting projections that are retained in corresponding ones of the plurality of slots when the secondary fascia member is positioned in complete attachment with the main fascia member.

9. The vehicle rear fascia assembly according to claim 1, wherein the main fascia member includes a recessed area that extends from the first lateral side along the mid-section to the second lateral side, the recessed area being dimensioned and shaped to receive the secondary fascia member.

10. The vehicle rear fascia assembly according to claim 1, wherein the secondary fascia member includes a mid-section between the first lateral end and the second lateral end, the mid-section of the secondary fascia having an upper panel section that extends in a forward direction relative to the vehicle at least partially defining a sill area of a rear door opening of the vehicle.

11. The vehicle rear fascia assembly according to claim 10, wherein the mid-section of the secondary fascia member includes a downwardly extending panel portion that extends over a corresponding lower portion of the main fascia member.

12. The vehicle rear fascia assembly according to claim 1, wherein the secondary fascia member includes a mid-section between the first lateral end and the second lateral end, the mid-section of the secondary fascia having a downwardly extending panel portion that extends downward over a corresponding portion of the main fascia member.

* * * * *